(12) United States Patent
Cohen

(10) Patent No.: US 10,803,522 B2
(45) Date of Patent: Oct. 13, 2020

(54) COMPUTING SYSTEM THAT GENERATES GRAPHICAL DISPLAYS OF STOCK OPTIONS TRADING DATA

(71) Applicant: Guy Cohen, Esher (GB)

(72) Inventor: Guy Cohen, Esher (GB)

(73) Assignee: Montal Research Ltd (GB)

( * ) Notice: Subject to any disclaimer, the term of this patent is extended or adjusted under 35 U.S.C. 154(b) by 0 days.

(21) Appl. No.: 16/029,643

(22) Filed: Jul. 8, 2018

(65) Prior Publication Data

US 2018/0315123 A1  Nov. 1, 2018

Related U.S. Application Data

(63) Continuation-in-part of application No. 13/691,734, filed on Nov. 30, 2012, now abandoned.

(51) Int. Cl.
*G06Q 40/04* (2012.01)
*G06T 11/20* (2006.01)

(52) U.S. Cl.
CPC ............ *G06Q 40/04* (2013.01); *G06T 11/206* (2013.01)

(58) Field of Classification Search
USPC ........................................................ 715/215
See application file for complete search history.

(56) References Cited

U.S. PATENT DOCUMENTS

| | | | |
|---|---|---|---|
| 7,212,997 B1 | 5/2007 | Pine et al. | |
| 7,930,232 B2 | 4/2011 | Cooper et al. | |
| 8,269,774 B2 * | 9/2012 | Buck | G06Q 30/06 345/440.2 |
| 8,515,849 B2 | 8/2013 | Sagi et al. | |
| 8,615,456 B2 | 12/2013 | Weinstein | |
| 2002/0004774 A1 | 1/2002 | Defarlo | |
| 2002/0194114 A1 | 12/2002 | Erdmier | |
| 2003/0139957 A1 | 7/2003 | Satchwell | |
| 2006/0036531 A1 * | 2/2006 | Jackson | G06Q 20/042 705/37 |

(Continued)

OTHER PUBLICATIONS

Trading Technologies International Inc.; Researchers Submit Patent Application, "Click Based Trading With Intuitive Grid Display of Market Depth", for Approval, NewsRx. May 29, 2019 (Year: 2019).*

*Primary Examiner* — Namrata Boveja
*Assistant Examiner* — Amit Patel
(74) *Attorney, Agent, or Firm* — LaMorte & Associates P.C.

(57) ABSTRACT

A system that produces a predictive chart for a selected stock that is useful in determining if the price of a particular stock is likely to increase or decrease. Open interest data is obtained for the selected stock from an options exchange. Likewise, the option volume data for stock options in the selected stock is also obtained. A computing device calculates implied volatility for the stock options of the selected stock. Options volatility indicator data is then calculated as a function of the open interest data, the volume data, and the implied volatility. The options volatility indicator data is normalized. The normalized data is plotted against selected trading periods to produce an options volatility indicator graph. The options volatility indicator graph is then shown on a display that is controlled by the computing device.

19 Claims, 4 Drawing Sheets

(56) References Cited

U.S. PATENT DOCUMENTS

| | | | |
|---|---|---|---|
| 2008/0228633 A1* | 9/2008 | Kalt | ............. A43B 13/026 |
| | | | 705/37 |
| 2009/0259599 A1 | 10/2009 | Wallman | |
| 2011/0179360 A1* | 7/2011 | Horwarth | ............. G06Q 40/04 |
| | | | 715/738 |
| 2011/0270732 A1 | 11/2011 | Ritter et al. | |
| 2012/0233051 A1* | 9/2012 | Sheldon | ............. G06Q 40/04 |
| | | | 705/37 |

\* cited by examiner

COMPUTING SYSTEM THAT GENERATES GRAPHICAL DISPLAYS OF STOCK OPTIONS TRADING DATA

RELATED APPLICATIONS

The application is a continuation-in-part of U.S. patent application Ser. No. 13/691,734 filed Nov. 30, 2012.

BACKGROUND OF THE INVENTION

1. Field of the Invention

In general, the present invention relates to computer systems that produce graphs from various stock market data. More particularly, the present invention relates to computer systems that generate graphs using options trading data.

2. Prior Art Description

In finance, an option is a contract which gives the owner the right, but not the obligation, to buy or sell an underlying asset or instrument at a specified strike price on or before a specified date. The seller incurs a corresponding obligation to fulfill the transaction, that is to sell or buy, if the long holder elects to "exercise" the option prior to expiration. The buyer pays a premium to the seller for this right. An option which conveys the right to buy something at a specific price is called a "call". An option which conveys the right to sell something at a specific price is called a "put".

The value of an option is comprised of two components. The first component is the "intrinsic value" of the option. The intrinsic value of an option is determined by the difference between the market value of the underlying option and the strike price for that option. The second component in valuating an option is the discounted expected value of the option at the expiration of the option. The discounted expected value is a complex interrelationship of many factors. The discounted expected value and the resulting overall valuation of options are, therefore, subject to many interpretations depending upon how the various factors are utilized in an analysis.

One of the most important factors in estimating the discounted expected value of an option is the implied volatility of the option during a trading session. In financial mathematics, the implied volatility of an option contract is that value of the volatility of the underlying instrument which, when input in an option pricing model, will return a theoretical value equal to the current market price of the option. Implied volatility is a forward-looking and subjective measure that often differs from historical volatility.

An option pricing model uses a variety of inputs to derive a theoretical value for an option. Inputs to pricing models vary depending on the type of option being priced and the pricing model used. However, in general, the value of an option depends on an estimate of the future realized price volatility, $\sigma$, of the underlying. In 1973, the Black-Scholes pricing model for exchange-traded options was published by Myron Scholes and Fisher Black. Using the Black-Scholes model, the price of a call option can be expressed mathematically as:

$$C = f(\sigma, \cdot)$$

where C is the theoretical value of an option, and $f$ is a pricing model that depends on $\sigma$, along with other inputs. The function $f$ is monotonically increasing in $\sigma$, meaning that a higher value for volatility results in a higher theoretical value of the option. The realized price volatility $\sigma$ is the square root of the quadratic variation of the stock's log price process.

Today the Black-Scholes formula is in use daily by thousands of traders to value option contracts traded in markets around the world. The Black-Scholes pricing formula, along with other theoretical option pricing models, calculates the fair value of an option in part by assuming that fair value will be the price someone would pay in order to break even in the long run. The model employs several parameters that can affect the value of an option, the most important of which are the price difference between the underlying instrument and the strike price of the option, the volatility of the underlying instrument's return, and the time to expiration of the option.

The Black-Scholes equation is a partial differential equation, which describes the price of the option over time. The key idea behind the equation is that one can perfectly hedge the option by buying and selling the underlying asset in just the right way and consequently "eliminate risk". This hedge, in turn, implies that there is only one right price for the option. The Black-Scholes equations and other similar applications have been applied to many prior art option trading methodologies. Such prior art systems are exemplified by U.S. Patent Application Publication No. 2006/0036531 to Jackson, entitled Short-Term Options Trading System.

In certain instances, the buying and selling of options can be a powerful indicator of future stock price changes. For instance, large institutions may want to obtain a stock position in a specific company. However, the institution does not want to buy that full position all at once. If they did, the demand for the stock would outreach supply and the stock would rise in price. As such, the institution's own actions would increase the price of the stock that the institution would have to pay. The same concept holds true if an institution wants to sell a large position in a company. They cannot sell the stock all at once or else the price of the stock may crash and the institution would not get value from the stock being sold. In such situation, institutional investors often obtain options to buy and or sell the stock at specified prices. In this way, the institution can sell the stock over a prolonged period of time at a stable price. The buying and/or selling would not appear significant on any one given trading day, thereby maintaining stock price stability. If a smaller investor can determine that an institution is buying or selling a particular stock in the options market, then such an investor can predict that a stock will increase or decrease in price with a good degree of reliability.

Although equations exist for determining the implied volatility of stock options and calculate the ideal valuations of options, no reliable methodology exists for rapidly determining if stock options are currently being bought or sold in a manner that would predict a movement in future stock price. The present invention provides a system and method for analyzing options trading data as a function of open interest, option buying volume and implied volatility in order to detect the buying and selling of stock options by institutional traders in real time. The system produces a graph that provides a visual indication as to the likelihood that a certain stock price will trend up or down depending upon options data. Such information can then be used to assess risk when making stock and/or option trades in that stock. The details of the present invention system are described and claimed below.

SUMMARY OF THE INVENTION

The present invention is a system that produces a predictive chart for a selected stock. The chart is useful in determining if the price of a particular stock is likely to increase or decrease in the next trading session of a stock market.

A computing device is provided that has at least one microprocessor. The computing device is connected to a data network that receives options volume data and open interest data from an exchange that trades stock options. The microprocessor is programmed with an implied volatility formula that generates an implied volatility value for a selected stock.

The microprocessor calculates options volatility indicator data as a function of the open interest data, the options volume data and the implied volatility value. The options volatility indicator data, one generated by the computing device, is normalized between the values of positive one and negative one. This normalized data is used to generate a graph. The normalized data is plotted against a trading period to create a custom graph. The custom graph s shown on a display that is controlled by the computing device. By viewing the custom graphs on the display, trends can be inferred. The trends can be used as predictive models to show changes in the likelihood that a stock price will increase or decrease.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be used to analyze data from a variety of option types and futures contracts, the present invention is particularly well suited for evaluating data for options that correspond to a publicly traded stock that is listed on one of the world's major stock exchanges. The exemplary embodiment illustrated shows the system being used to generate graphs based upon options data for a publicly traded stock. This embodiment is selected in order to set forth one of the best modes contemplated for the invention. The illustrated embodiment, however, is merely exemplary and should not be considered a limitation when interpreting the scope of the appended claims.

Figure 1:
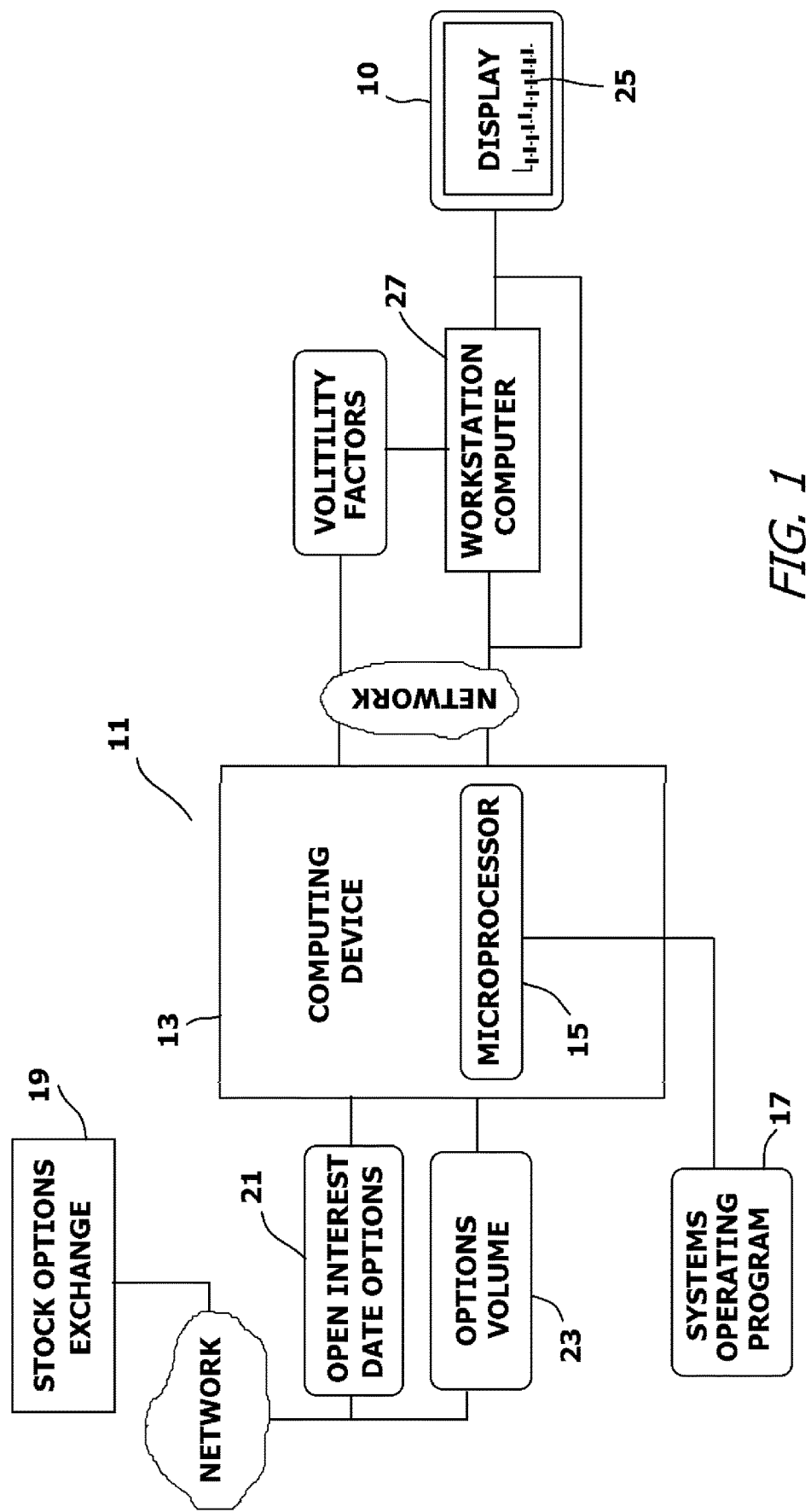
FIG. 1 is a schematic showing an exemplary embodiment of the present invention system.

Referring to FIG. 1, a system 11 is shown. The system 11 utilizes one or more computing devices 13. The computing devices 13 can be a dedicated computer or a server that contains multiple server blades. The computing device 13 can also be any network of computers that share processing power, memory and/or data storage. It will therefore be understood that the computing device 13 contains, or has access to, one or more microprocessors 15 that can be programed to run the systems operating program 17 of the present invention.

The computing device 13 has access to data from an open stock exchange 19. The data may be public data obtained over the worldwide web, or private data obtained from a private options trading company. The data obtained from the open stock exchange includes open interest data 21 for stack and option trading volume data 23 for those same stocks.

As will be further explained in detail, the system 11, utilizes the open interest data 21 and the option trading volume data 23 to generate specialized graphs 25. The specialized graphs 25 are shown on a display 10 that is either linked to the computing device 13 or is part of a workstation 27 that is linked to the computing device 13. The workstation 27 also enables systems administrators to interact with the system 11 and enter various market volatility factors 29, that will later be explained.

Figure 2:
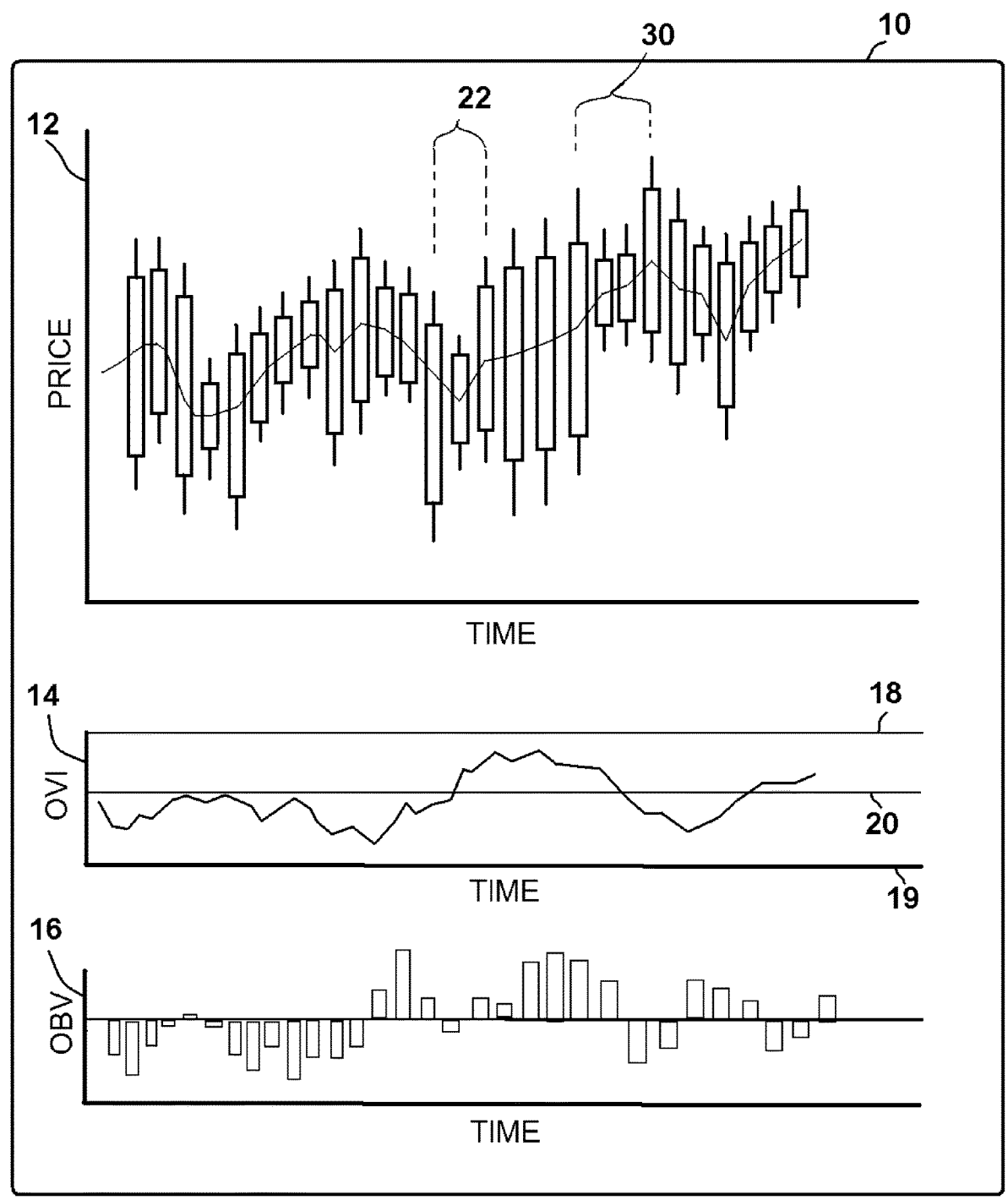
FIG. 2 shoes the display of the exemplary system displaying a price chart graph, an option buying volume graph, and an option volatility indicator graph for a selected stock.

Referring to FIG. 2 in conjunction with FIG. 1, the display 10 is shown displaying the specialized graphs 25 generated by the system 11. The specialized graphs 25 include a price chart graph 12 for a selected stock, an options volatility indicator (OVI) graph 14, and an options buying volume (OBV) graph 16. The price chart graph 12 for the selected stock is a traditional candlestick graph that shows the opening price, closing price and price range of the selected stock for each trading day. Such a price chart graph is well known in the industry and its data is provided by the stock exchange upon which the selected stock is listed. Likewise, the options buying volume graph 16 is also well known in the industry. The data needed to generate the options buying volume graph 16 is provided by the options trading market that trades options in the selected stock. The options buying volume graph 16 and the price chart graph 12 are aligned by date. Consequently, by viewing the price chart graph 12 and the options buying volume graph 16, a person can determine both the stock price and the options buying volume of the selected stock on any particular date.

The options volatility indicator graph 14 is uniquely generated by the present invention system 11. The options volatility indicator graph 14 is a normalized line chart that has a maximum chart value 18 of positive one and a minimum chart value 19 of negative one, with zero being the midline 20 of the graph 14. The options volatility indicator graph 14 is aligned by date with both the price chart graph 12 and, optionally, with the options buying volume graph 16. The purpose of the options volatility indicator graph 14 is to provide a visual indication as to current market trends concerning the selected stock. If the options volatility indicator graph 14 is in the positive zone, i.e. between the midline 20 and the maximum chart value 18, then there is a likelihood that the options in the stock are being purchased by one or more large investors. As a consequence, it is less likely that the price of the selected stock will decrease in the next trading session. The more consistently positive the data is on the options volatility indicator graph 14, the more confidence a person can have that the stock is in a bullish market.

Conversely, if the data on the options volatility indicator graph 14 has a persistently negative value, i.e. between the midline 20 and the minimum chart value 19, then a person can see that the selected stock is in a bearish market and the price of the selected stock is more likely to decrease in the next trading session. The more negative the data on the options volatility indicator graph 14 becomes, the more confident a person can be that the selected stock is in a bearish market.

Figure 3:
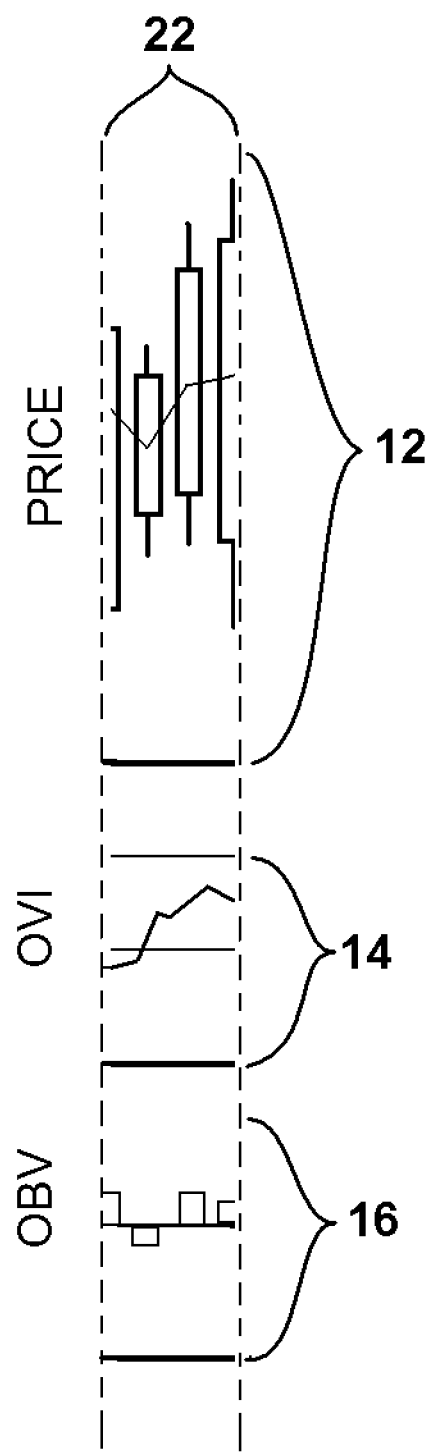
FIG. 3 is an enlarged view of a first section of the display shown in FIG. 2.

The data displayed by the options volatility indicator graph 14 must be viewed on context. This is why the preferred display 10 also shows the price chart graph 12. The addition of the options volatility indicator graph 14 is optional and may be preferred by some traders. Referring to FIG. 3, an enlarged section 22 of the initial display (10, FIG. 2) is shown. In the enlarged section 22, it can be seen that the price chart graph 12 has a positive slope from the last few trading days. Accordingly, the short term price trend shows an increasing price. The options buying volume graph 16 is in the positive for that same short term trend. Lastly, the options volatility indicator graph 16 has been positive throughout that same short term trend. With the information taken together, a trader can visually determine that it is more likely than not that the price of the selected stock will increase with the next days trading.

Figure 4:
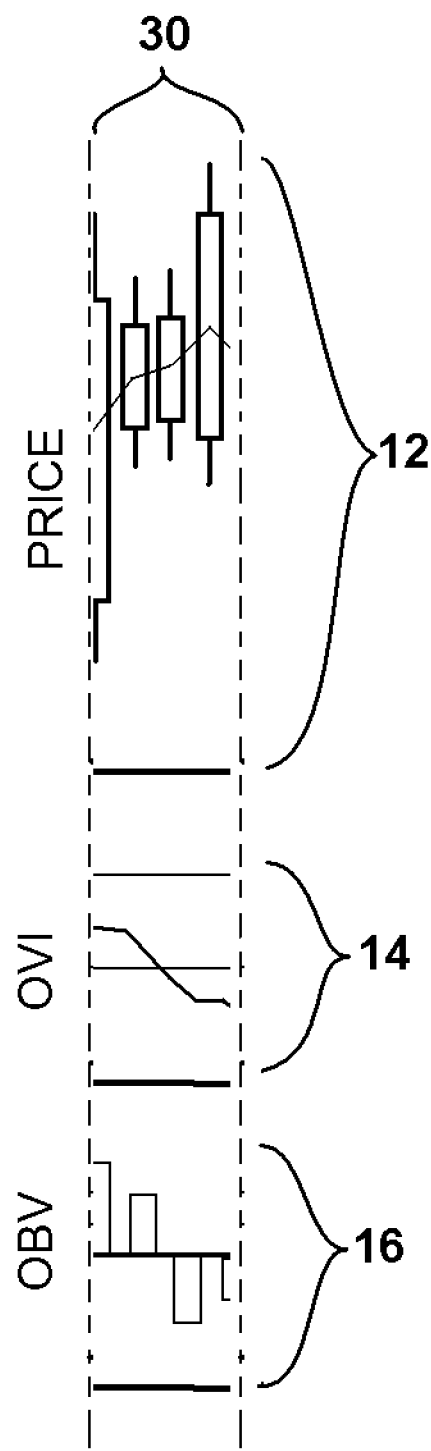
FIG. 4 is an enlarged view of a second section of the display shown in FIG. 2.

Referring to FIG. 4, a different enlarged section 30 of the selected display (10, FIG. 2) is shown. In this section, the price of the selected stock is relatively constant. However, in that same time period, the data of the options buying volume graph 16 shows a decrease, while the data of the options volatility indicator graph 14 has a negative slope. With the stock price being stagnant and the other two indicators being bearish, a trader would be able to conclude that the price of the selected stock is not on the increase and is likely to decrease. This assumption turns out to be true, as indicated in subsequent areas of the various graphs.

It will therefore be understood that utilizing a stock price chart graph 12, an options buying volume graph 16, and the options volatility indicator graph 14, a trader is provided with insight into the buying and selling of options that can be used to predict stock price trends.

Figure 5:
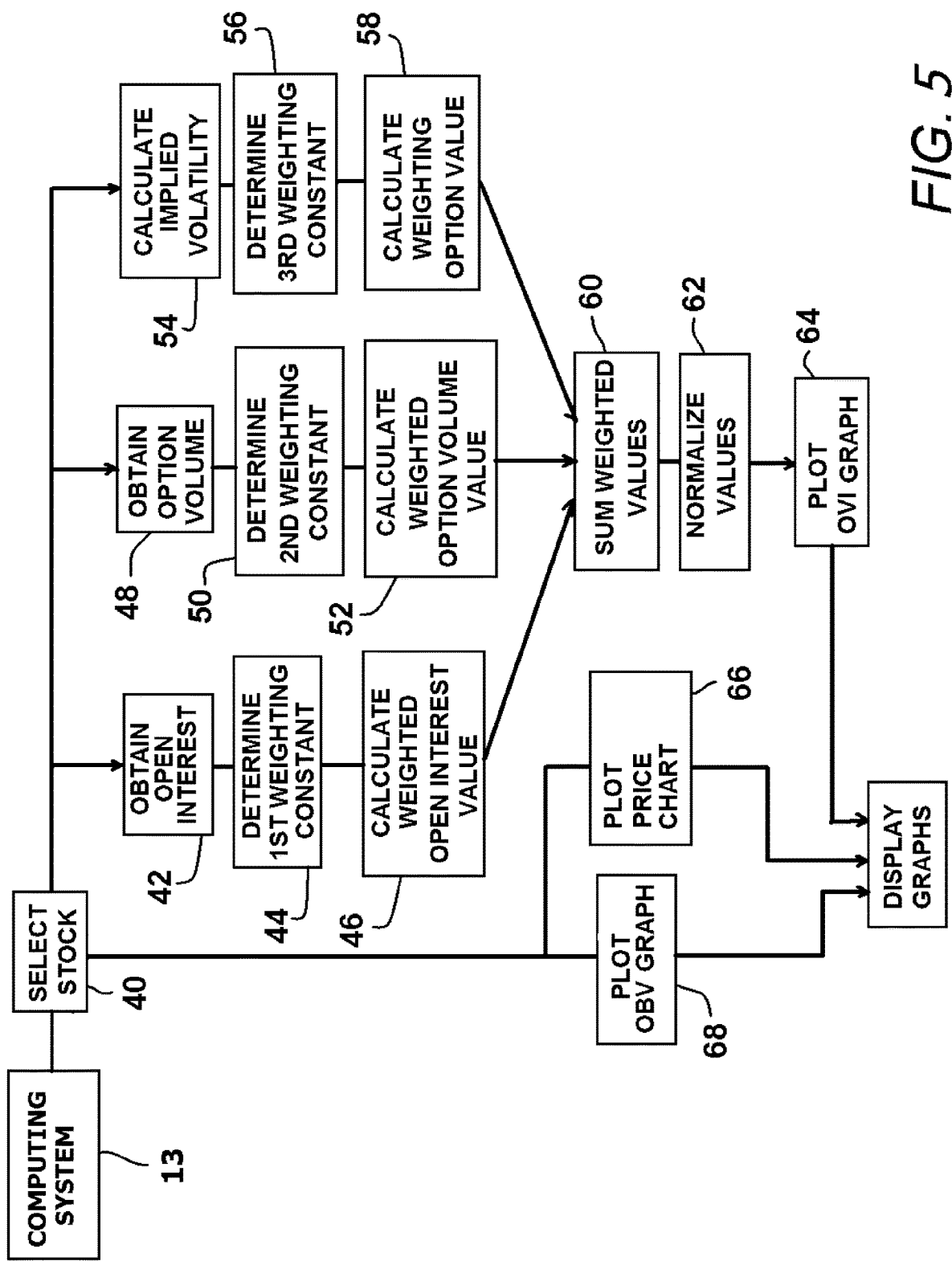
FIG. 5 is a block diagram illustrating the methodology utilized by the present invention system.

Referring to FIG. 5 in conjunction with FIG. 1, the operation of the computing system 11 that creates the options volatility indicator graph 14 is described. As is indicated by Block 40, a person using the workstation 27 utilizes the system 11 to select a stock. The user also selects the expiry months and strike prices for which the open interest data 21 for the selected stock is obtained. See Block 42. The open interest data 21 indicates the total number of options or futures contracts that are not closed or delivered on a particular day or other selected period of time. The open interest data 21 is publicly available information.

A first weighting constant is determined for the open interest data 21. See Block 44. The first weighting constant may be determined by market factors and statistical process controls. For instance, the selected stock may be for a company that has just announced the release date of a new consumer product. Option trading approaching that release date may be uncharacteristically high or low. The first weighting factor will therefore change to compensate for the blip in the open interest data 21, provided that blip or dip is attributable to identifiable market forces. The first weighting factor can be ascertained by systems operating program 17 or can be entered by the user via the workstation 27. Once calculated and entered, the first weighting constant is multiplied by the open interest to create a weighted open interest value. See Block 46.

The options volume data 23 for the selected stock is also obtained by the system 11. See Block 48. The other variables selected are which expiry months and strike prices to use. These are the same variables selected for the open interest data 21. The options volume data 23 indicates the volume of options bought and sold during the trading day, or other trading period, for the selected stock. The call volume is considered "positive" and the put volume "negative". The options volume data 23 is also publicly available information.

A second weighting constant is determined for the options volume data 23. See Block 50. The second weighting constant is determined by market forces and statistical process controls. Any unusual blip or dip in the options volume data 23 may be compensated for using the second weighting constant, provided the market forces for the blip or the dip can be identified. For example, if the entire options market is having a slow day, this decrease in options volume can be compensated for using the second weighting constant. Once calculated, the second weighting constant is multiplied by the option volume data 23 to create a weighted options volume value. See Block 52.

The implied volatility is calculated for the selected stock. See Block 54. The implied volatility is calculated using the Black-Scholes model or other implied volatility formulas. The model is directed to the expiry months and strike price previously selected for the open interest and options volume.

A third weighting constant is determined for the implied volatility. See Block 56. The third weighting constant may also be determined by market forces and statistical process controls. Any unusual blip or dip in the options volume data is compensated for using the third weighting constant, provided the market forces for the blip or the dip can be identified. For example, if the entire stock market is having a volatile day due to some unexpected world event, then this increase in volatility can be compensated for using the third weighting constant. Since the third weighting constant may be subjective, it can be entered by the user via the workstation 27 if not ascertained by systems operating program 17. Once calculated, the third weighting constant is multiplied by the implied volatility to create a weighted implied volatility value.

The first weighting constant, the second weighting constant and the third weighting constant all add up to a total constant value of one-hundred. Once the weighted implied volatility value, the weighted option volume value and the weighted open interest value are known, the three values are added together. See Block 60. The added values are then mathematically normalized between the values of positive one and negative one. See Block 62. This produced the data for the option volatility indicator graph 14 for the trading day. The data is then plotted to create the option volatility indicator graph. See Block 64.

As is indicated by Blocks 66, 68 and 64, the price chart, and options volatility indicators are separately plotted to create the price chart graph 12, options buying volume graph 16 and options volatility indicator graph 14, respectively. The three graphs 12, 14, 16 are then presented together on the display 10 for visual inspection by a trader. The three graphs 12, 14, 16 are synchronized chronologically on the display 10 so that they can each be referenced for different information corresponding to the same trading period.

The result is a simple graphical indication that helps a trader determine if the price of a stock is going to increase or decrease depending upon how options for that selected stock are trading, the volume of options buying and the price chart history for the stock.

It will be understood that the present invention system that is illustrated and described is merely exemplary and that a person skilled in the art can make many variations to the embodiment. The preferred display may only contain the price chart graph and the options volatility index graph. Likewise, other graphs, such as the stock trade volume graph can also be displayed for a selected stock. All such embodiments are intended to be included within the scope of the present invention as defined by the claims.

What is claimed is:

1. A system linked to real time data from an options exchange from which real time open interest data and real time option trading volume data can be obtained for a selected stock, wherein said system produces a graphical indication as to current market trends concerning price changes for said selected stock during a trade period, said system comprising:

a computing device having at least one microprocessor, wherein said computing device receives said real time options volume data and said real time open interest data, and wherein said microprocessor is programmed with an implied volatility formula that generates an implied volatility value for said selected stock;

wherein said microprocessor calculates options volatility indicator data as a function of said real time open interest data, said real time options volume data and said implied volatility value, and normalizes said options volatility indicator data between the values of positive one and negative one to produce a normalized data; and an electronic display, controlled by said computing device, that displays said graphical indication, wherein said graphical indication includes an options volatility indicator graph that plots said normalized data against said trading period.

2. The system according to claim 1, wherein said options volatility indicator graph includes said normalized data plotted between a maximum chart value of one and a minimum chart value of negative one.

3. The system according to claim 1, wherein said microprocessor is programmed to multiply said real time open interest data by a first weighting constant to produce weighted open interest data.

4. The system according to claim 3, wherein said microprocessor is programmed to multiply said real time options volume data by a second weighting constant to produce weighted options volume data.

5. The system according to claim 4, wherein said microprocessor is programmed to multiply said implied volatility value by a third weighting constant to produce weighted implied volatility.

6. The system according to claim 5, wherein said first weighting constant, said second weighting constant and said third weighting constant have a sum that equals one hundred.

7. The system according to claim 6, wherein said microprocessor calculates said options volatility indicator data by adding said weighted open interest data, said weighted options volume data, and said weighted implied volatility.

8. The system according to claim 1, wherein said graphical indicator shown on said electronic display includes a price chart for said selected stock on said display with said options volatility indicator graph.

9. The system according to claim 8, wherein said price chart and said options volatility indicator graph are aligned by said trading period on said electronic display.

10. The system according to claim 9, wherein said graphical indicator shown on said electronic display includes an options buying volume graph on said electronic display for said selected stock.

11. The system according to claim 8, wherein said options buying volume graph and said options volatility indicator graph are shown together on said electronic display and are aligned by said trading period.

12. A system for displaying a predictive chart for a selected stock, comprising:

a computing device having at least one microprocessor, wherein said computing device receives real time options volume data and real time open interest data from an options exchange that trades stock options, and wherein said microprocessor is programmed to generate an implied volatility value for said selected stock and to weight said real time open interest data, said real time options volume data, and said implied volatility to produce weighted open interest data, weighted options volume data and weighted implied volatility;

wherein said computing system sums said weighted open interest data, said weighted options volume data, and said weighted implied volatility to produce options volatility indicator data that is normalized and plotted against a time period to produce an options volatility indicator graph;

an electronic display controlled by said computing device that displays said options volatility indicator graph as at least part of said predictive chart.

13. The system according to claim 12, wherein said options volatility indicator data is normalized between the values of positive one and negative one.

14. The system according to claim 13, wherein said step of weighting said real time open interest data, said real time options volume data, and said implied volatility value are multiplied by weighting constants.

15. The system according to claim 14, wherein said weighting constants have a sum that equals one hundred.

16. The system according to claim 12, wherein said predictive chart includes a price chart for said selected stock on said electronic display with said options volatility indicator graph.

17. The system according to claim 16, wherein said price chart and said options volatility indicator graph are aligned by said trading period on said electronic display.

18. The system according to claim 12, wherein said predictive chart includes an options buying volume graph on said electronic display for said selected stock.

19. The system according to claim 18, wherein said options buying volume graph and said options volatility indicator graph are shown together on said electronic display and are aligned by said trading period.

* * * * *